(12) United States Patent
Chen et al.

(10) Patent No.: US 8,713,069 B2
(45) Date of Patent: Apr. 29, 2014

(54) PLAYLIST SEARCH DEVICE, PLAYLIST SEARCH METHOD AND PROGRAM

(75) Inventors: Yanchen Chen, Tokyo (JP); Yoshihito Ohki, Tokyo (JP); Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 12/582,395

(22) Filed: Oct. 20, 2009

(65) Prior Publication Data
US 2010/0042595 A1 Feb. 18, 2010

(30) Foreign Application Priority Data

Oct. 21, 2008 (JP) ................. P2008-271151

(51) Int. Cl.
*G06F 7/00* (2006.01)
(52) U.S. Cl.
USPC .......................................................... 707/802
(58) Field of Classification Search
CPC .................... G06F 17/30053; G06F 17/30174
USPC .................................. 707/802, 803, 804, 812
See application file for complete search history.

(56) References Cited

U.S. PATENT DOCUMENTS

| | | | | |
|---|---|---|---|---|
| 7,725,204 B2* | 5/2010 | Takatsuka | ....................... | 700/94 |
| 7,836,109 B2* | 11/2010 | Hamada | ....................... | 707/828 |
| 8,208,782 B2* | 6/2012 | Hamada et al. | ............... | 386/248 |
| 8,588,945 B2* | 11/2013 | Araki et al. | ..................... | 700/94 |
| 2003/0232635 A1* | 12/2003 | Yanagishita | ..................... | 463/9 |
| 2006/0041577 A1* | 2/2006 | Ellicott et al. | ................ | 707/102 |
| 2006/0181968 A1* | 8/2006 | Yamada et al. | ............ | 369/30.26 |
| 2007/0024594 A1* | 2/2007 | Sakata et al. | ................... | 345/173 |
| 2007/0282903 A1* | 12/2007 | Bustelo et al. | ............. | 707/104.1 |
| 2008/0148923 A1* | 6/2008 | Choo | ............................. | 84/609 |
| 2008/0222188 A1* | 9/2008 | Watson et al. | ............... | 707/102 |
| 2009/0144273 A1* | 6/2009 | Kappos | ............................ | 707/5 |
| 2010/0070490 A1* | 3/2010 | Amidon et al. | ............... | 707/722 |

FOREIGN PATENT DOCUMENTS

| | | |
|---|---|---|
| EP | 1 708 200 A1 | 10/2006 |
| JP | 2007-287256 | 11/2007 |

OTHER PUBLICATIONS

M. Torrens et al., "Visualizing and Exploring Personal Music Libraries", Proceedings Annual International Symposium on Music Information Retrieval, 8 pages (2004) XP007901560.
M. Crampes et al., "Automatic Playlist Composition in a Dynamic Music Landscape", Proceedings of the 2007 international workshop on Semantically aware document processing and indexing, pp. 15-20 (2007) XP-002568488.

(Continued)

*Primary Examiner* — Hung T Vy
(74) *Attorney, Agent, or Firm* — Finnegan, Henderson, Farabow, Garrett & Dunner, L.L.P.

(57) ABSTRACT

A playlist search method includes: using, as search criteria, one or more pieces of content attribute information of a first content contained in a first playlist to search for a second playlist which contains a second content having one or more pieces of common content attribute information with the first content and is different from the first playlist; obtaining the first playlist and the second playlist; and displaying a plurality of contents contained in the first playlist and the second playlist in such a manner that the first playlist and the second playlist cross each other with the first content and the second content used as a base point.

12 Claims, 18 Drawing Sheets

(56) References Cited

OTHER PUBLICATIONS

O. Goussevskaia et al., "Exploring Music Collections on Mobile Devices" Proceeding of the 10$^{th}$ International Conference on Human Computer Interaction with Mobile Devices and Services, pp. 359-362 (2008) XP-002568487.

European Search Report dated Mar. 17, 2010 in EP 09 25 2339.8.

* cited by examiner

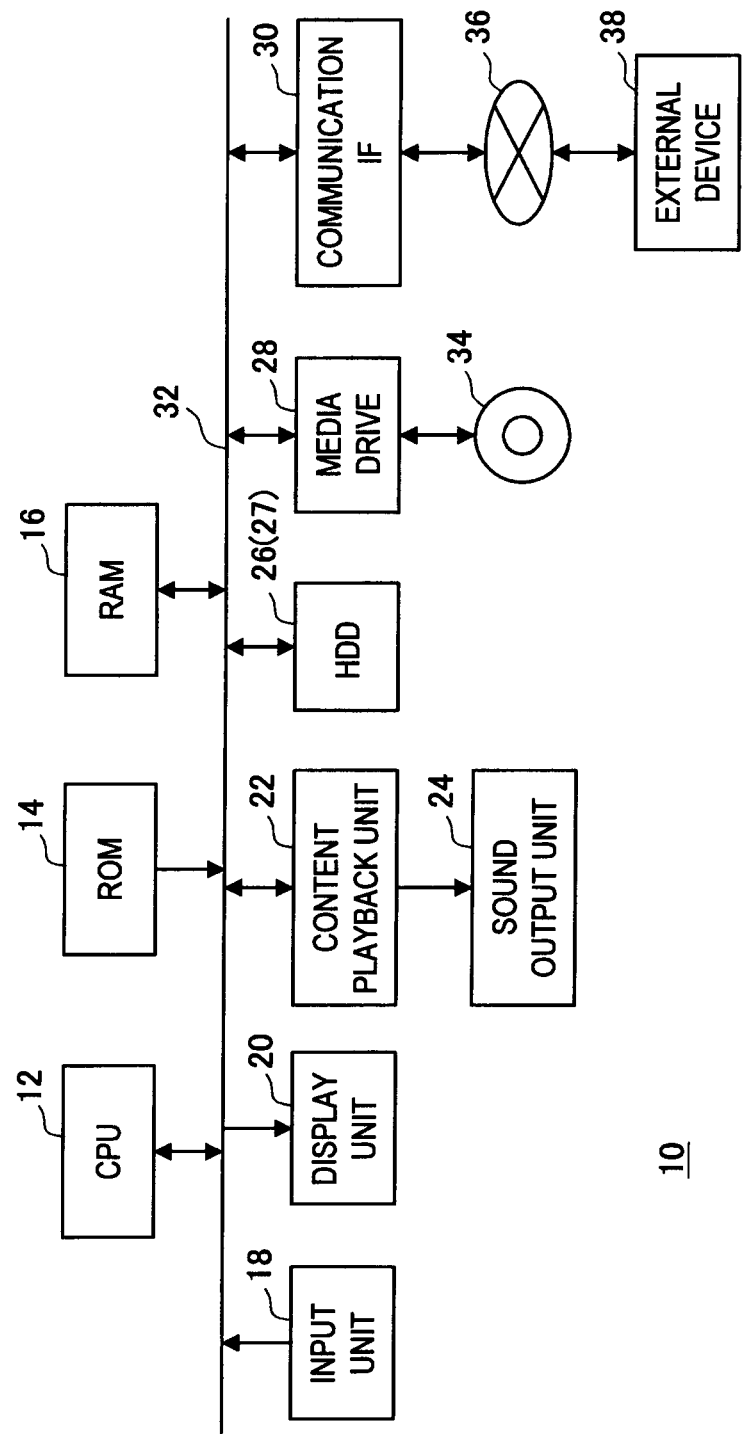

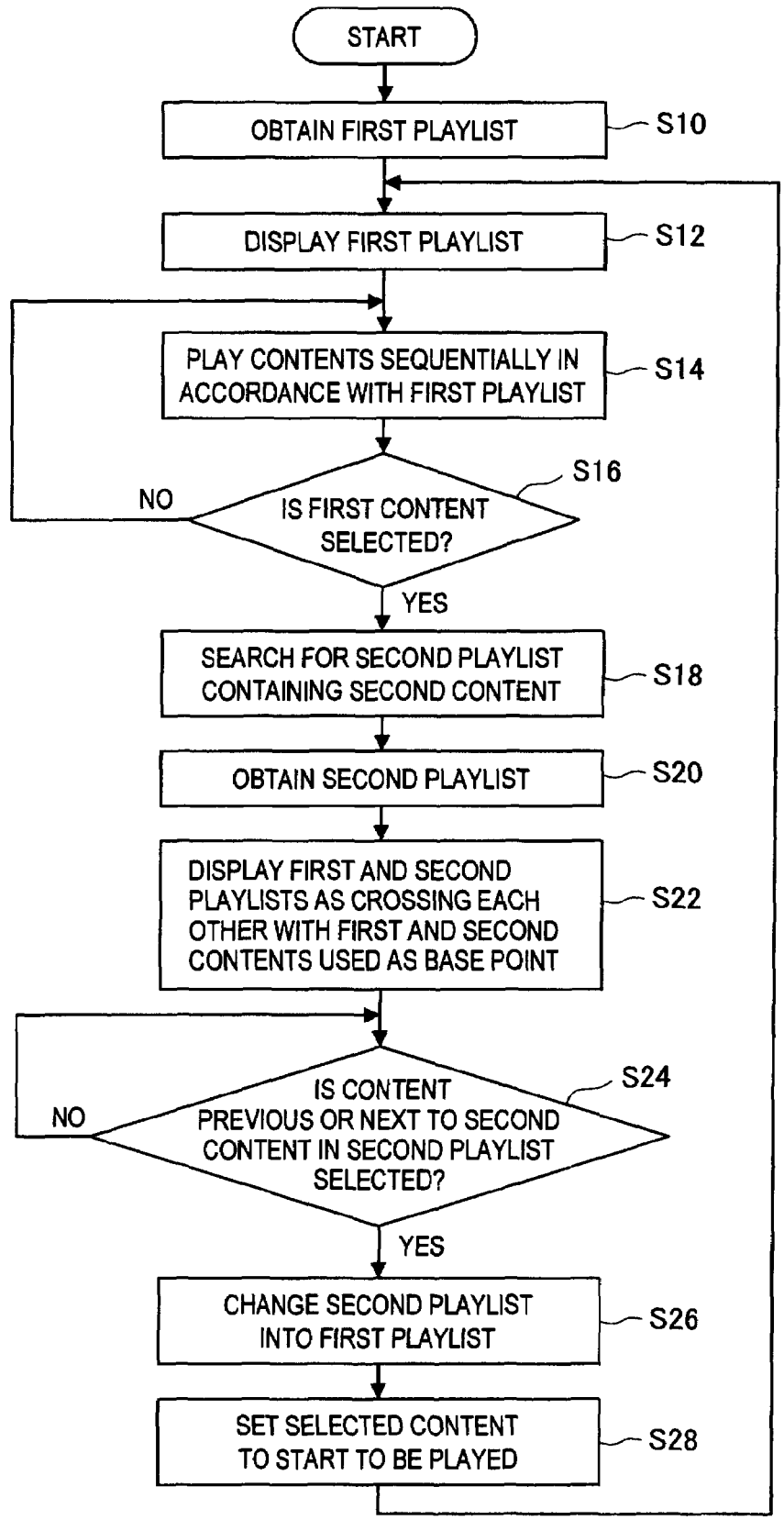

FIG.3A
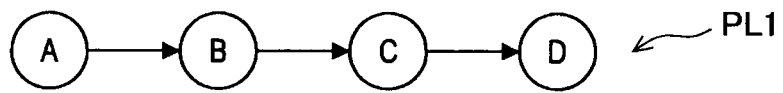
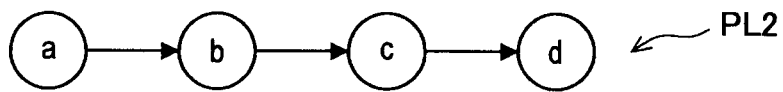
FIG.3B
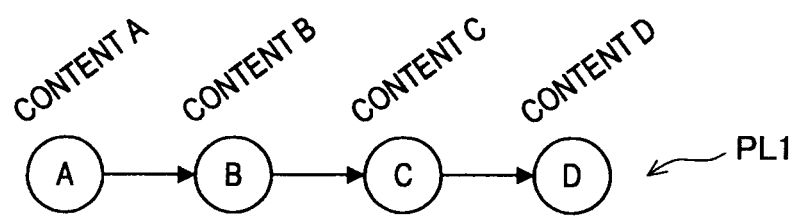
FIG.3C
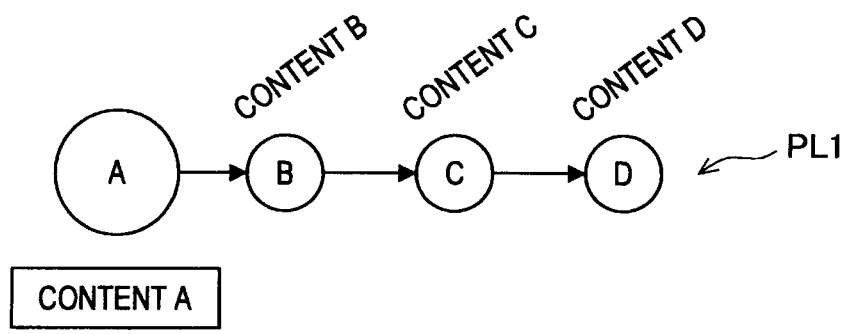

FIG.7A
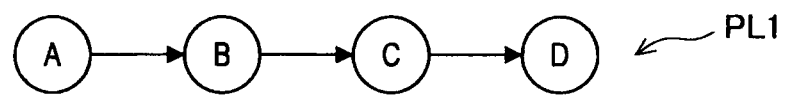
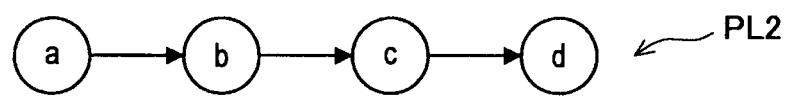
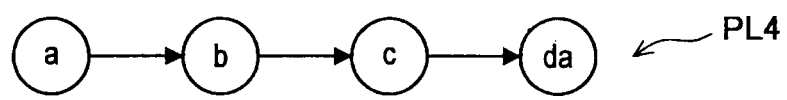
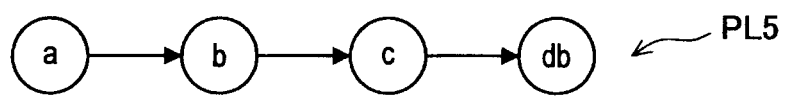
FIG.7B
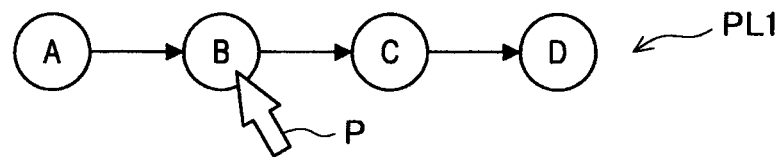

PLAYLIST SEARCH DEVICE, PLAYLIST SEARCH METHOD AND PROGRAM

BACKGROUND OF THE INVENTION

1. Field of the Invention

The present invention relates to a playlist search device, a playlist search method and a program.

2. Description of the Related Art

In the related art, there is known a content playback apparatus for playing contents of sound, static images and moving images continuously in accordance with a playlist created in advance. The playlist is index information of a plurality of contents to be played continuously, and the contents are arranged in the playback order. The playlist is characterized in that the contents to be played back continuously are arranged with predetermined continuity, association and the like therebetween.

A user creates a playlist by himself and utilizes it on the playback apparatus. In addition, the user obtains a playlist exposed to public view on the network or recorded in an external medium and utilizes it on the playback apparatus.

Here, in recent years, as usable playlists increase more, it becomes more difficult for the user to select a playlist that matches his preference. For this reason, for example, as disclosed in Japanese Patent Application Laid-open No. 2007-287256, there has been proposed a system for searching for and displaying an associated playlist similar to a playlist containing played contents.

SUMMARY OF THE INVENTION

However, in the above-mentioned system, as the associated playlist is searched for based the similarity of the playlists, an associated playlist selected may be a playlist with which a content of no continuity or association with a played content is played following the played content. In this case, the content continuity, association and the like, which are important characteristics of a playlist, are lost.

The present invention has been made in view of the above-mentioned issue, and it is desirable to provide new and improved playlist search device, playlist search method and program, capable of searching for a related playlist while the continuity, association and the like of the contents are not lost.

In order to solve the above-mentioned issue, according to a first embodiment of the present invention, there is provided a playlist search device including a playlist search unit using, as search criteria, one or more pieces of content attribute information of a first content contained in a first playlist to search for a second playlist which contains a second content having one or more pieces of common content attribute information with the first content and is different from the first playlist, a playlist obtaining unit for obtaining the first playlist and the second playlist, and a playlist display unit for displaying a plurality of contents contained in the first playlist and the second playlist in such a manner that the first playlist and the second playlist cross each other with the first content and the second content used as a base point.

According to this structure, the content attribute information of the first content is used as search criteria to search for the second playlist containing the second content having one or more pieces of common content attribute information. Then, the first and second playlists are displayed so as to cross each other with the first and second contents used as a base point. That is, the second playlist can be searched for as an associated playlist without losing the continuity, association and the like of the contents.

In order to solve the above-mentioned issue, according to a second embodiment of the present invention, there is provided a playlist search method applicable to the playlist search device according to the first aspect of the present invention. In addition, according to a third embodiment of the present invention, there is provided a program for a computer to execute the playlist search method according to the second embodiment of the present invention.

The present invention provides a playlist search device, a playlist search method and a program capable of playlist search without losing the continuity, association and the like of the contents.

BRIEF DESCRIPTION OF THE DRAWINGS

FIG. 1 is a block diagram showing a structural example of a playlist search device;

FIG. 2 is a flowchart for explaining a playlist search method according to a first embodiment;

FIG. 3A is a view for explaining the playlist search method according to the first embodiment;

FIG. 3B is a view for explaining the playlist search method according to the first embodiment;

FIG. 3C is a view for explaining the playlist search method according to the first embodiment;

FIG. 7A is a view for explaining a modified example 1 of playlist display;

FIG. 7B is a view for explaining the modified example 1 of playlist display;

DETAILED DESCRIPTION OF THE EMBODIMENTS

Figure 3D:
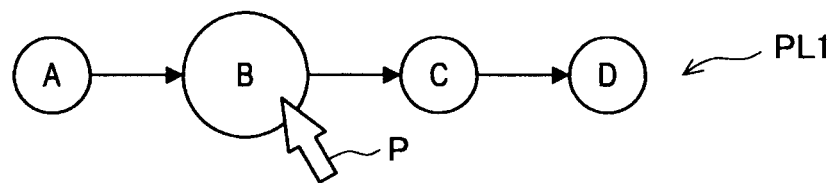
FIG. 3D is a view for explaining the playlist search method according to the first embodiment.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Structure of Playlist Search Device)

First, with reference to FIG. 1, a playlist search device 10 according to an embodiment of the present invention will be described. The following description is given by way of example where the playlist search device 10 has a sound content playback function, searches for a playlist of sound contents and plays the sound contents contained in the playlist.

FIG. 1 is a block diagram showing a structural example of the playlist search device 10. The playlist search device 10 is structured as an information processing apparatus such as a personal computer, for example.

As shown in FIG. 1, the playlist search device 10 includes a CPU 12, a ROM 14, a RAM 16, an input unit 18, a display unit 20, a content playback unit 22, a sound output unit 24, a hard disk drive (HDD) 26, a media drive 28 and a communication interface (IF) 30, which are all connected to a bus 32.

The CPU 12 performs processing and control of each part necessary for basic operation of the information processing apparatus by, when the playlist search device 10 is started, reading a system program from the ROM 14 and developing it on the RAM 16 for execution. The CPU 12 reads an application program such as a playlist search program or the like via the HDD 26 and develops it on the RAM 16 for execution. The CPU 12 performs processing and control of each part necessary for the operation of the playlist search device 10 in accordance with a playlist search program, as described later. Here, the CPU 12 functions as a playlist search unit, a playlist obtaining unit and a playlist change unit.

The ROM 14 stores various data and system programs, and data in the ROM 14 and the like are read out by the CPU 12 and sent onto the bus 32. The RAM 16 is used as an operation area for the CPU 12 to execute the system programs and the application programs. Data and the like in the RAM 16 are read out by the CPU 12 and sent onto the bus 32. The data and the like written by the CPU 12 are stored into the RAM 16 via the bus 32.

The input unit 18 is structured to contain an input device such as a keyboard and a mouse, and outputs commands, data and the like, which are input by a user via the input unit 18, to the CPU 12 via the bus 32. The display unit 20 is structured to contain a display device such as a display, a monitor or a display panel, and outputs to the display device processing results and the like processed by the CPU 12 and sent to the bus 32. Here, the input unit 18 functions as a content selecting unit and the display unit 20 functions as a playlist display unit.

Here, the display device may be either integral with or separate from the playlist search device 10. The input device and display device may be provided as one piece like a touch panel.

The content playback unit 22 plays contents by performing predetermined processing on content data. In this embodiment, the content playback unit 22 plays sounds by performing predetermined processing on the content data of the sound contents and outputting the data to the sound output unit 24.

The sound output unit 24 is structured to contain a speaker or the like and outputs to the outside sound information of content data processed and input by the content playback unit 22. The sound output unit 24 may be provided either integrally with or separately from the playlist search device 10.

The HDD 26 stores application programs and various data in a hard disk 27. The HDD 26 stores in the hard disk 27 a playlist of sound contents and content data. The HDD 26 reads data and the like in the hard disk 27 in response to reading instructions from the CPU 12 and sends them onto the bus 32, while it writes in the hard disk 27 the data and the like on the bus 32 in response to the writing instructions from the CPU 12.

The media drive 28 performs reading and writing of data and the like with an external medium 34 such as a memory card, magnetic disk or magnetic optical disk. The external medium 34 stores a playlist of sound contents and content data. The media drive 28 reads out data and the like in the external medium 34 in response to the reading instructions from the CPU 12 and sends them onto the bus 32. The media drive 28 writes the data and the like on the bus 32 into the external medium 34 in response to the writing instructions from the CPU 12.

The communication IF 30 is structured to contain a communication device for performing data communication with an external device 38. The external device 38 is an information processing apparatus such as a personal computer connected to the playlist search device 10, for example, via a network 36 or the like. The external device 38 contains a playlist of sound contents and content data.

Here, the playlist is index information having a plurality of contents to be played continuously or sequentially, the contents being arranged in the playback order. The playlist is created by arranging the contents in such a manner that the contents played sequentially have predetermined continuity, association and the like. Here, the continuity and association of the contents mean that in the case of sound contents, the contents have the same or similar music features (music tempo, melody and the like) and music impressions felt by listeners (brightness, furioso and the like).

The playlist contains playlist identification information, and content identification information and content attribute information of each content assigned with the playback order.

The content identification information is, for example, code information or the like, and contains content data association information for associating content data of each content with the playlist. The content attribute information is information showing content attribute and may include image data preset for each content. In this case, the content attribute information is information which helps to specify a record album, title and artist of each content. The information may be either text information showing specific name or code information assigned to each name.

The playlist is created by a user by the playlist search device 10 or the like and stored in the hard disk 27 to be obtainable via the HDD 26. The playlist may be exposed to the public on the network 36 in such a way as to be obtainable via the communication IF 30, or may be stored in the external device 38. The playlist may be recorded in the external medium 34 as, for example, album information of a record album, in such a way as to be obtainable via the media drive 28.

The content data is data for content playback. The content data contains content data identification information corresponding to the content data association information contained in the playlist so that the contents can be played back continuously in accordance with the playlist.

In the playlist search device 10, the CPU 12 obtains the playlist of sound contents from the hard disk 27 via the HDD 26, for example, and stores it on the operation area on the RAM 16. The CPU 12 obtains content data associated with a content contained in the playlist from the hard disk 27, for example, prior to playback of the content, and stores it in the operation area on the RAM 16.

When the user selects a predetermined playlist as a first playlist (playback list) via the input unit 18, the CPU 12 displays the first playlist on the display unit 20. The CPU 12 plays contents contained in the first playlist sequentially following the first playlist by the content playback unit 22.

When the user selects, for example, a first content in the first playlist via the input unit 18, the CPU 12 searches for a second playlist (associated playlist). Finding one or more second playlists, the CPU 12 obtains the second playlists and stores them in the operation area on the RAM 16.

The CPU 12 searches for a second playlist in the hard disk 27, the external medium 34 or the external device 38 via the HDD 26, the media drive 28 or the communication IF 30. The CPU 12 searches for the second playlist which is different from the first playlist and contains a second content having one or more pieces of common content attribute information with the first content by using the content attribute information of the first content as search criteria.

Here, in the case of sound contents, the first and second contents have one or more pieces of common content attribute information including title, artist name and record album. Therefore, the first and second contents hold continuity and association, which means that they are the same as or similar to each other in their music feature, music impression felt by the listeners and the like. Here, the first and second contents may be the same contents that are common in all of the content attribute information.

The CPU 12 displays the first and second playlists on the display unit 20. The CPU 12 displays on the display unit 20 the plural contents contained in the first and second playlists in such a manner that the first playlist crosses the one or more second playlists with the first and second contents used as a base point.

When the user selects any content previous or next to the second content in the second playlist, for example, via the input unit 18, the CPU 12 changes the second playlist to the first playlist. The CPU 12 obtains from the hard disk 27, the external medium 34 or the external device 38 content data of sound contents contained in the first playlist (second playlist before change) and stores it in the operation area on the RAM 16. The CPU 12 makes the content playback unit 22 continuously play the contents contained in the first playlist in accordance with the first playlist, starting with the second content or selected content.

(Playlist Search Method)

Next, a playlist search method according to the present embodiment of the present invention will be described with reference to FIGS. 2 to 4.

<First Embodiment>

First, with reference to FIGS. 2, 3A to 3J and 4, the playlist search method according to a first embodiment will be described. FIG. 2 is a flowchart for explaining the playlist search method according to the first embodiment, FIGS. 3A to 3J are views for explaining the playlist search method according to the first embodiment and FIG. 4 is a view for showing a specific example of the playlist.

In FIG. 3A, a playlist PL1 stored in the hard disk 27 and a playlist PL2 held in the external device 38 are shown. The playlist PL1 is used for continuous playback of the contents A, B, C and D in this order, while the playlist PL2 is used for continuous playback of the contents a, b, c and d in this order. Here, the content b has one or more pieces of common content attribute information with the content B. Here, the playlists PL1 and PL2 may be stored or held in at least one of the hard disk 27, the external medium 34 and the external device 38.

The CPU 12 obtains one or more playlists (first playlist) of sound contents via the HDD 26 (step S10 in FIG. 2). Then, the CPU 12 stores the playlist in the operation area on the RAM 16. The CPU 12 displays the obtained playlist (playlist PL1 in the case of FIG. 3A) on the display unit 20 so that the user can select the first playlist. Here, the CPU 12 may obtain the playlist via at least one of the HDD 26, the media drive 28 and the communication IF 30.

When the user selects via the input unit 18 the playlist PL1 as the first playlist, the CPU 12 displays the playlist PL1 on the display unit 20 as shown in FIG. 3B (S12). The CPU 12 displays the attribute information of the contents A to D in the playback order.

Here, in the figures including FIG. 3B, explained below, content attribute information is simplified for convenience of explanation. However, the content attribute information may be displayed containing one or more pieces of information of content record album, title, artist name and image data.

When the user uses the input unit 18 to give instructions to start playback of the playlist PL1, the CPU 12 obtains the content data of the content A contained in the playlist PL1 via the HDD 26 (S14). Then, the CPU 12 stores the content data of the content A in the operation area of the RAM 16. Here, the CPU 12 may obtain the content data of the content A via the communication IF 30 or the media drive 28 instead of the HDD 26.

The CPU 12 plays back the content A by the content playback unit 22 based on the content data of the content A. When the playback of the content A is finished, the CPU 12 obtains the content data of the content B in the same manner as the content A and plays the content B by the content playback unit 22 (S14).

Here, as shown in FIG. 3C, the CPU 12 displays the playlist PL1 such that the played content A is identifiable. FIG. 3C shows an enlarged state of the played content A; however the played content may be shown in any other display forms.

Figure 3E:
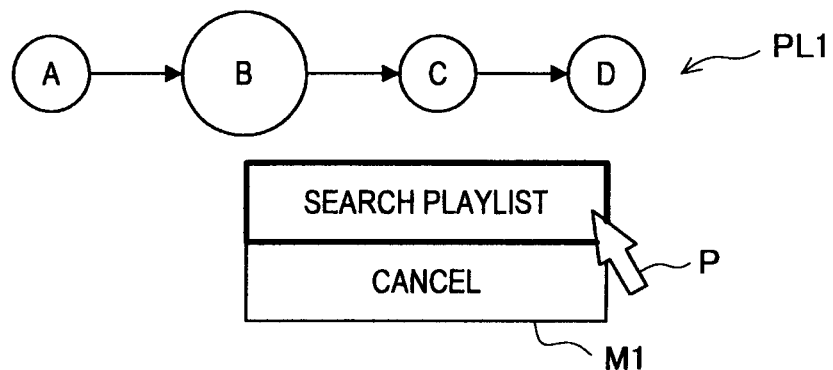
FIG. 3E is a view for explaining the playlist search method according to the first embodiment.

As shown in FIG. 3D, it is assumed that the user uses the input unit 18 to select the content B as the first content while the content B is played (S16). Here, in the figures including FIG. 3D and explained below, a pointer P of a mouse or the like is used to operate selection of the content, menu and the like. In this case, the CPU 12 displays a processing selection menu M1 on the display unit 20 as shown in FIG. 3E. The user can select execution of search of the second playlist (associated playlist) while the processing selection menu M1 is displayed.

When the user selects execution of search of the second playlist, the CPU 12 searches for the second playlist in the hard disk 27, the external medium 34, or the external device 38 (S18). The CPU 12 searches for, based on the search criteria of the content attribute information of the content B, the second playlist PL2 containing the second content having one or more pieces of common content attribute information with the content B and different from the first playlist (playlist PL1).

Here, as described above, the playlist PL2 held in the external device 38 contains the content b having one or more pieces of common content attribute information with the content B. Accordingly, the CPU 12 searches for the playlist PL2 as the second playlist on the external device 38 via the communication IF 30. The CPU 12 obtains the playlist PL2 based on the search result (S20). Then, the CPU 12 stores the playlist PL2 in the operation area on the RAM 16.

Figure 3F:
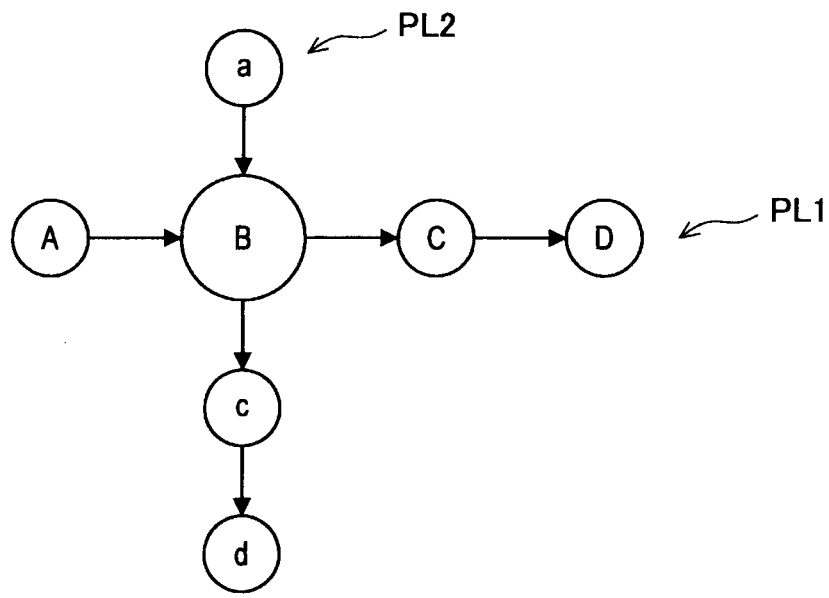
FIG. 3F is a view for explaining the playlist search method according to the first embodiment.

When obtaining the playlist PL2, the CPU 12 displays it on the display unit 20 together with the playlist PL1. Here, the CPU 12 displays the plural contents contained in the playlists PL1 and PL2 in such a manner that the playlists PL1 and PL2 cross each other with the content B and content b as a base point as shown in FIG. 3F (S22).

Figure 4:
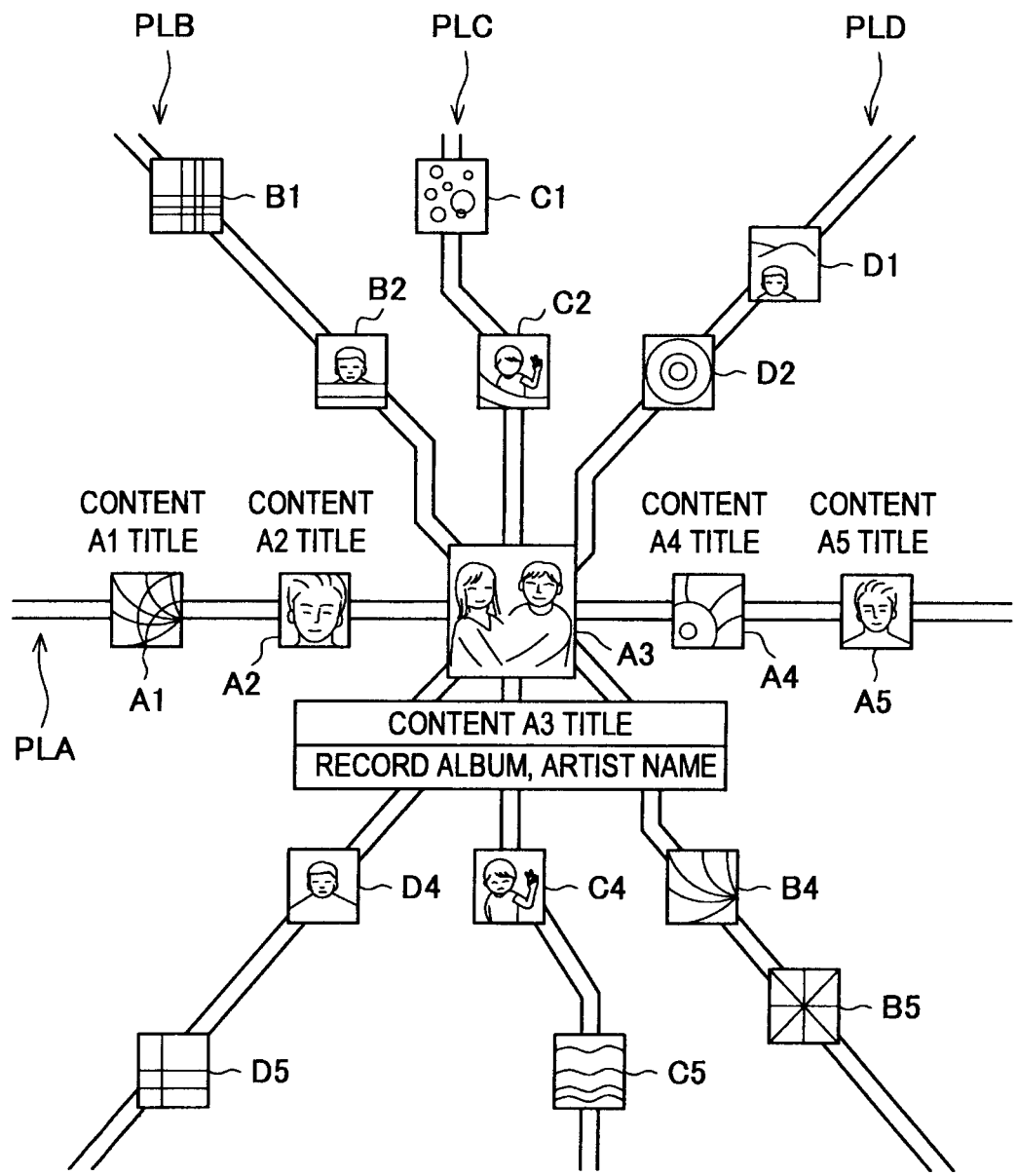
FIG. 4 is a view showing a specific example of playlist display.

FIG. 4 is a view of the specific example of the playlist. FIG. 4 shows the playlist PLA corresponding to the first playlist, and three playlists PLB, PLC and PLD corresponding to the second playlist. The playlists PLA, PLB, PLC and PLD contain the contents A1 to A5, B1 to B5, C1 to C5 and D1 to D5, respectively.

In FIG. 4, the plural contents contained in the playlists PLA to PLD are displayed in such a manner that the playlists PLA to PLD cross each other with the content A3 (first content) as a base point. Here, the contents B3, C3 and D3 (second contents) have one or more pieces of common content attribute information with the content A3 (first content).

The playlist display is similar to a route map in which the playlists PLA to PLD correspond to routes and the plural contents contained in the respective playlists PLA to PLD correspond to stations. Then, the playlists PLA to PLD corresponding to the routes are connected to each other at the content A3 as the transfer station.

Figure 3G:
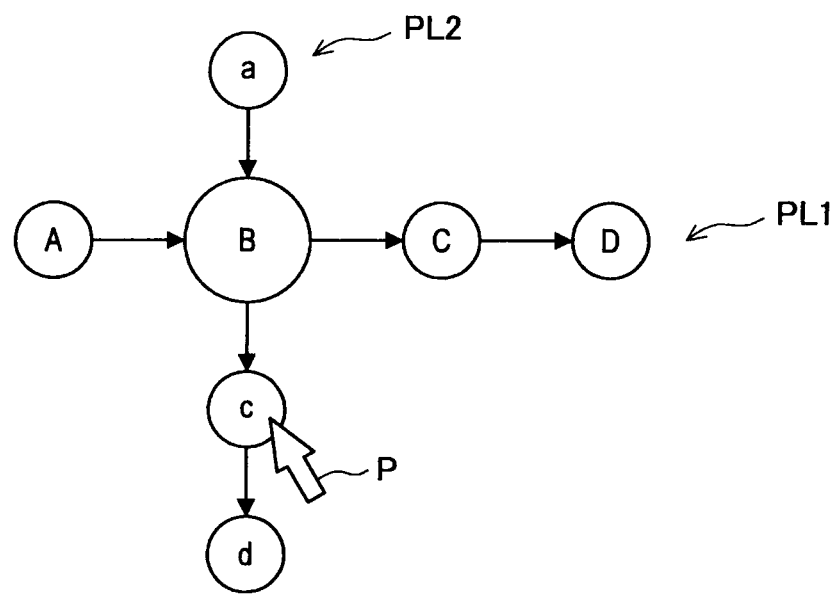
FIG. 3G is a view for explaining the playlist search method according to the first embodiment.

As shown in FIG. 3G, it is assumed that the user uses the input unit 18 to select the content c in the playlist PL2 while the playlists PL1 and PL2 are displayed (S24). In this case, the CPU 12 changes the first playlist from the playlist PL1 to the playlist PL2 (S26).

Figure 3H:
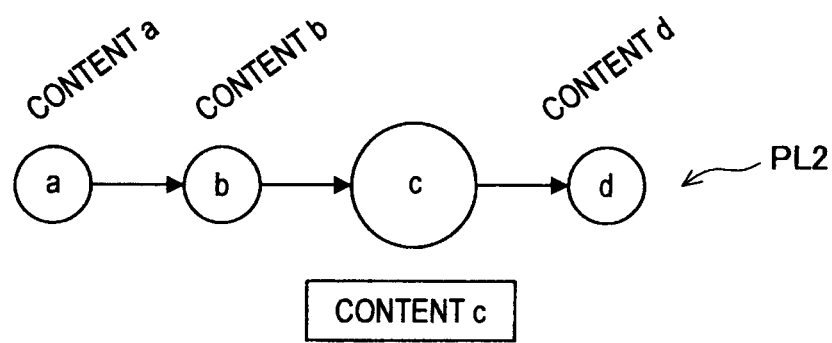
FIG. 3H is a view for explaining the playlist search method according to the first embodiment.

When the first playlist is changed to the playlist PL2, the CPU 12 displays on the display unit 20 content attribute information of the contents a to d contained in the playlist PL2 in the playback order, as shown in FIG. 3H (S12). Then, the CPU 12 continuously plays, by the content playback unit 22, the contents contained in the playlist PL2 (first playlist) following the playlist PL2 (S14), starting with the content c (or content b) (S28). The CPU 12 displays on the display unit 20 the playlist PL2 such that the played content c (or content b) is identifiable.

Figure 3I:
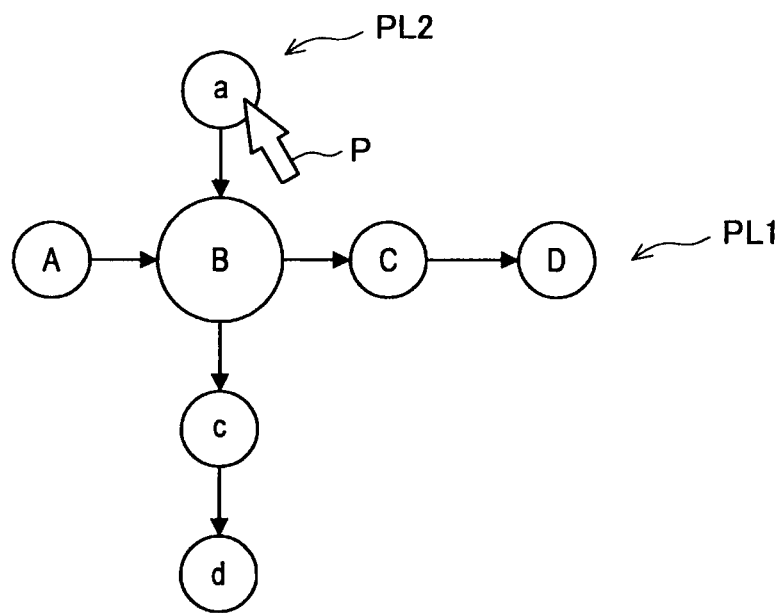
FIG. 3I is a view for explaining the playlist search method according to the first embodiment.

On the other hand, as shown in FIG. 3I, it is assumed that the user uses the input unit 18 to select the content a in the playlist PL2 while the playlists PL1 and PL2 are displayed. Also in this case, the CPU 12 changes the first playlist from the playlist PL1 to the playlist PL2.

Figure 3J:
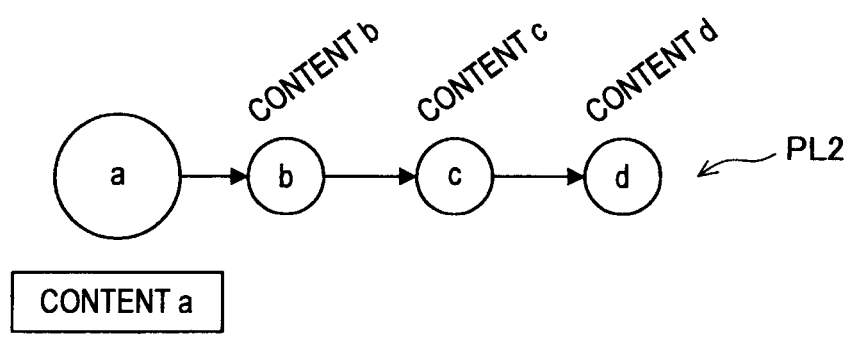
FIG. 3J is a view for explaining the playlist search method according to the first embodiment.

When the first playlist is changed to the playlist PL2, as shown in FIG. 3J, the CPU 12 displays on the display unit 20 attribute information of contents a to d contained in the playlist PL2 in the playback order. In this case, the contents a to d contained in the playlist PL2 may be played in the reverse order of the contents d, c, b and a or in a predetermined order of a, b, c and d.

Then, the CPU 12 continuously plays, by the content playback unit 22, the contents contained in the playlist PL2 following the playlist PL2 starting with the content a (or content b) (S28). As shown in FIG. 3J, the CPU 12 displays the playlist PL2 on the display unit 20 such that the played content a (or content b) can be identified.

In the above-described first embodiment, in accordance with the operation of playlist change, the contents contained in the second playlist are played following the first contents contained in the first playlist and in such a manner as to be previous to or next to the second content. Here, the content previous to or next to the second content has predetermined continuity, association and the like with the second content. Besides, following the first content, the content (or second content) is played which has one or more pieces of common content attribute information with the first content and is played before and after the second content. With this structure, the user can play the contents contained in the plural playlists in such a way that the continuity, association and the like of the contents may not be lost.

In addition, the playlist change operation is regarded as an operation in which, when it is assumed that the playlists are routes and contents contained in the playlists are stations, route is changed at the transfer station at which the first and second routes cross each other. Accordingly, the user is able to perform the playlist change operation by intuitive operation using existing mental data.

<Second Embodiment>

Next, a playlist search method according to a second embodiment will be described with reference to FIGS. 5A to 5I. FIGS. 5A to 5I are views for explaining the playlist search method according to the second embodiment.

Figure 5A:
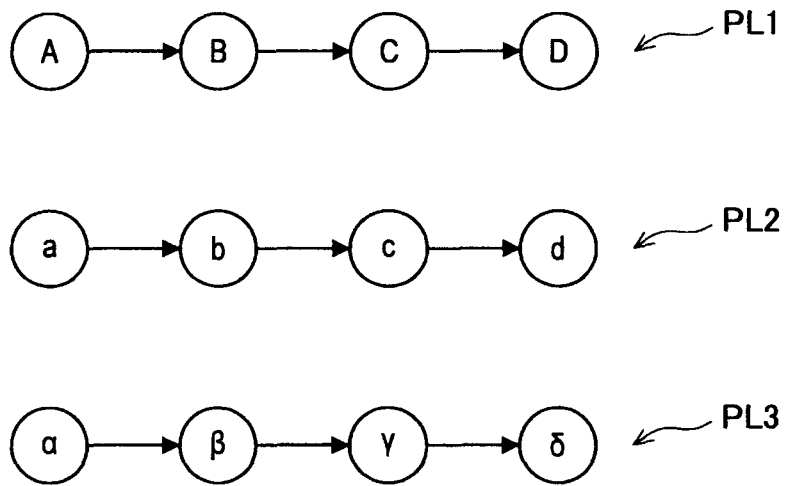
FIG. 5A is a view for explaining a playlist search method according to a second embodiment.

FIG. 5A shows the playlist PL1 stored in the hard disk 27, the playlist PL2 held by the external device 38 and the playlist PL3 recorded in the external medium 34. Explanation of the details of the playlists PL1 and PL2 is omitted here as they have been explained with reference to FIG. 3A. The playlists PL1 to PL3 may be stored or held in any of the hard disk 27, the external medium 34 and the external device 38.

The playlist PL3 is used for continuous playback of contents α, β, γ and δ in this order. Here, the content α has one or more pieces of common content attribute information with the content c.

Figure 5B:
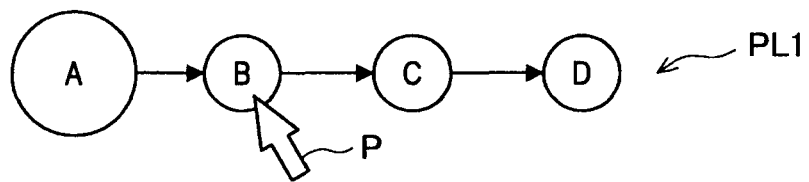
FIG. 5B is a view for explaining the playlist search method according to the second embodiment.
Figure 5C:
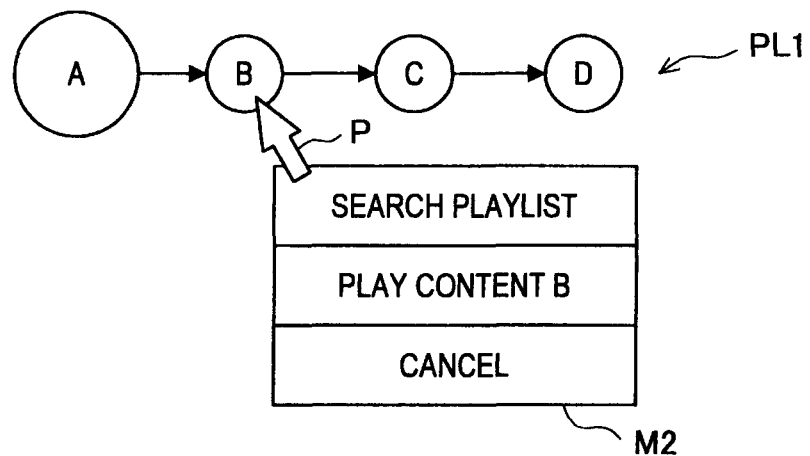
FIG. 5C is a view for explaining the playlist search method according to the second embodiment.

As shown in FIG. 5B, it is assumed that the user uses the input unit 18 to select the content B as the first content while the content A contained in the playlist PL1 is played. In this case, the CPU 12 displays on the display unit 20 the processing selection menu M2 as shown in FIG. 5C. Once the processing selection menu M2 is displayed, the user is able to select execution of the search processing of the second playlist (associated playlist) or execution of the playback processing of the content B.

Figure 5D:
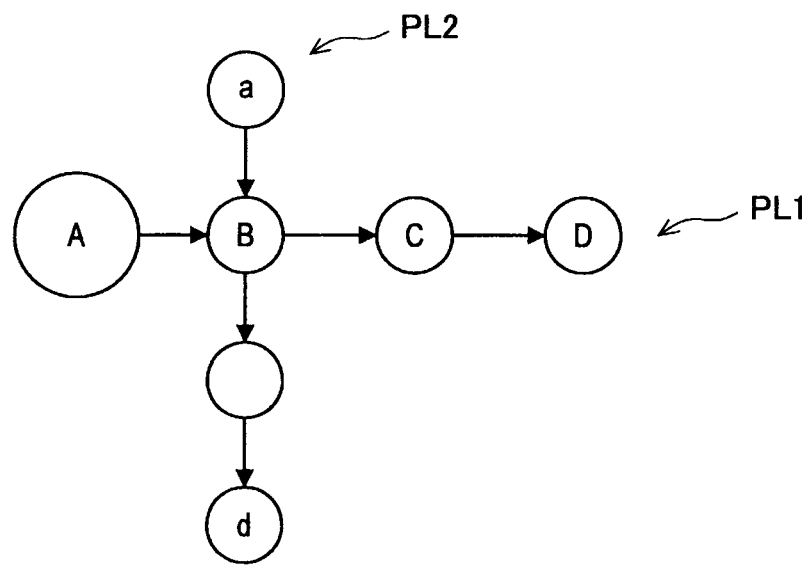
FIG. 5D is a view for explaining the playlist search method according to the second embodiment.

When the user selects execution of the search processing of the second playlist, the CPU 12 searches for the second playlist as in the first embodiment. Then, the CPU 12 displays on the display unit 20 the plural contents contained in the playlists PL1 and PL2 in such a manner that the playlists PL1 and PL2 cross each other with the content B and content b as a base point, as shown in FIG. 5D. The CPU 12 displays the playlists PL1 and PL2 on the display unit 20 so that the played content A can be identified.

Figure 5E:
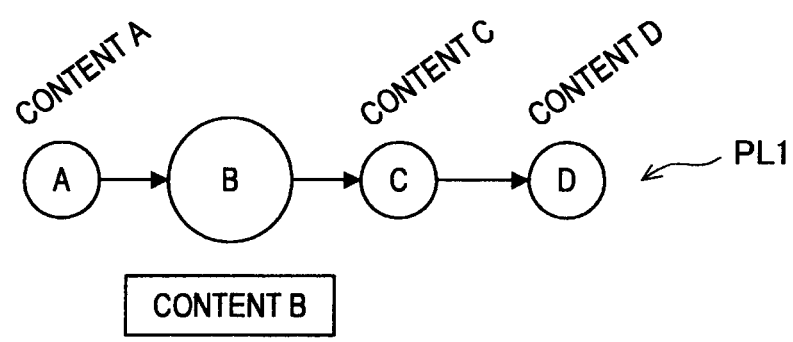
FIG. 5E is a view for explaining the playlist search method according to the second embodiment.

On the other hand, when the user selects execution of the playback processing of the content B in the state shown in FIG. 5C, the CPU 12 makes the content playback unit 22 stop playback of the content A and play the content B. Then, the CPU 12 displays the playlist PL1 on the display unit 20 so that the played content B can be identified as shown in FIG. 5E.

Figure 5F:
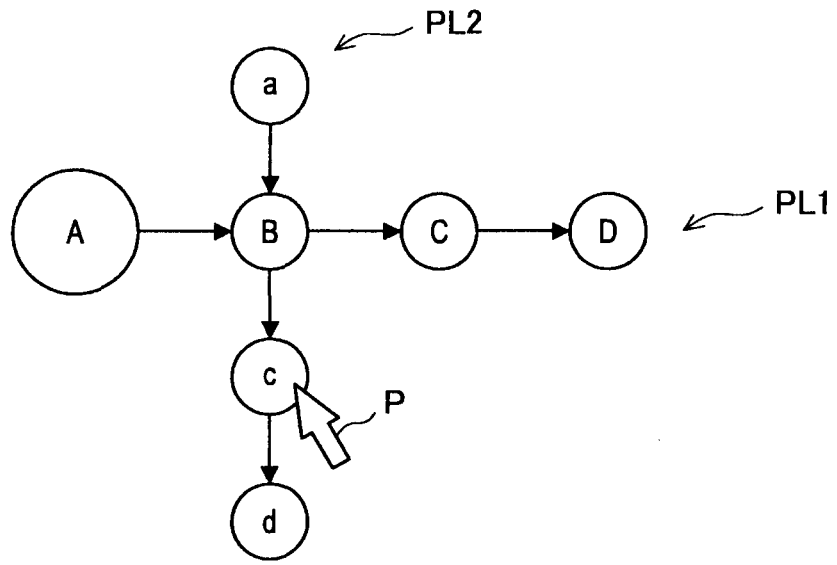
FIG. 5F is a view for explaining the playlist search method according to the second embodiment.
Figure 5G:
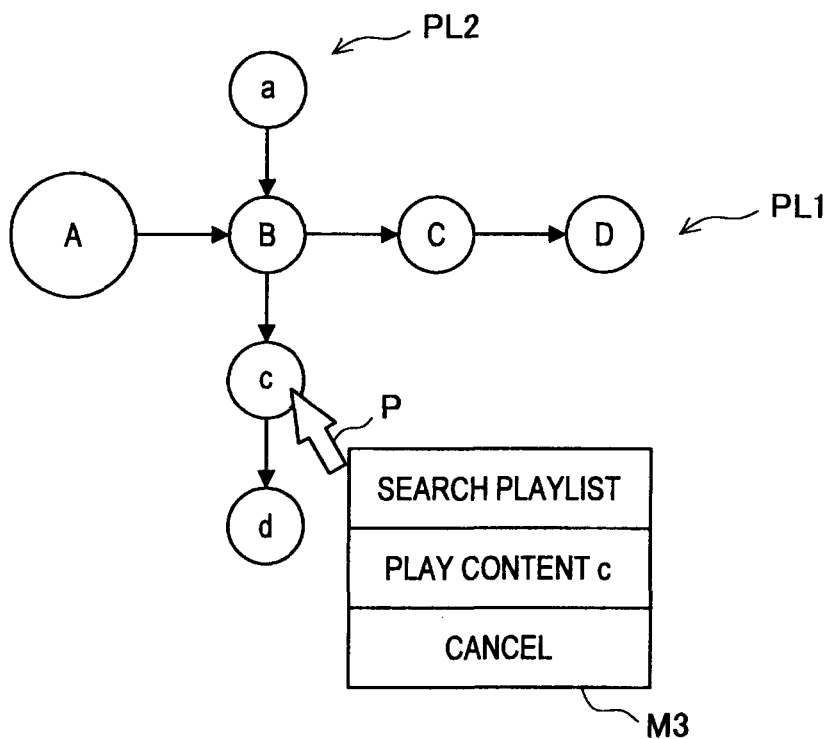
FIG. 5G is a view for explaining the playlist search method according to the second embodiment.

As shown in FIG. 5F, it is assumed that, when the playlists PL1 and PL2 are displayed, the user uses the input unit 18 to select the content c in the second playlist. In this case, the CPU 12 displays on the display unit 20 the processing selection menu M3 as shown in FIG. 5G. Once the processing selection menu M3 is displayed, the user is able to select execution of the search processing of the third playlist (associated playlist) or execution of the playback processing of the content c.

When the user selects execution of the search processing of the third playlist in the state shown in FIG. 5G, the CPU 12 searches for the third playlist on the hard disk 27, the external medium 34, or the external device 38. The CPU 12 searches for and obtains the playlist PL3 as the third playlist on the external medium 34 via the media drive 28, and stores it in the operation area on the RAM 16.

Figure 5H:
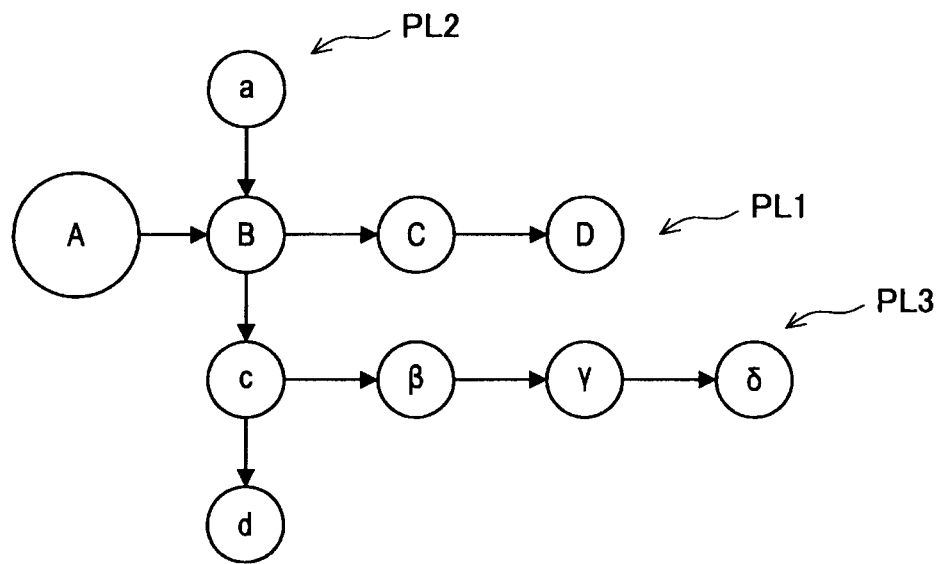
FIG. 5H is a view for explaining the playlist search method according to the second embodiment.

Once the CPU 12 obtains the playlist PL3, the CPU 12 displays it with the playlist PL2 on the display unit 20. Here, the CPU 12 displays the plural contents contained in the playlists PL2 and PL3 in such a manner that the playlists PL2 and PL3 cross each other with content c and content α as base points, as shown in FIG. 5H. Here, in the example shown in FIG. 5H, the playlist PL1 is shown with the playlists PL2 and PL3, but the playlist PL1 may not be displayed here.

Figure 5I:
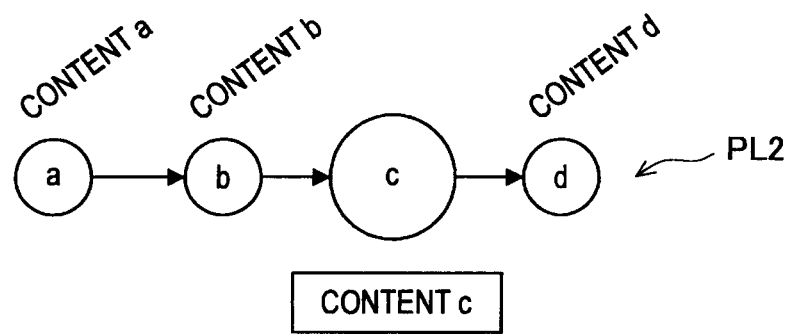
FIG. 5I is a view for explaining the playlist search method according to the second embodiment.

Meanwhile, when the user selects execution of the playback processing of the content c in the state shown in FIG. 5G, the CPU 12 makes the content playback unit 22 stop playback of the content A and play the content c. Then, the CPU 12 displays the playlist PL2 on the display unit 20 as shown in FIG. 5I so that the played content c can be identified.

In the above-described second embodiment, the second playlist is searched for and displayed based on the search criteria defined by the content attribute information of the selected first content, in accordance with the content selection operation on the first playlist. Then, the contents are played following the playlist containing the selected content in accordance with the content selection operation on the first or second playlist. Here, the contents contained in the first and second playlists are displayed in such a manner that the first and second playlists cross each other with the first and second contents as base points. With this structure, the user is able to know the group of the first and second playlists associated with the first content easily and efficiently select the playlist and/or content that he prefers.

The above explanation has been made with the playlist search device 10 having a content playback function which is used to search for a playlist during content playback. However, a similar explanation may be given in the case of a playlist search device which does not have content playback function and only performs playlist search.

<Third Embodiment>

Next, a playlist search method according to a third embodiment will be described with reference to FIGS. 6A to 6E. FIGS. 6A to 6E are views for explaining the playlist search method according to the third embodiment.

In the following, the playlist search method according to the third embodiment will be explained with use of the playlists PL1 to PL3 explained with reference to FIG. 5A.

Figure 6A:
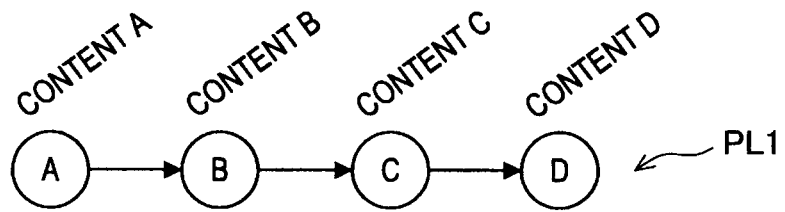
FIG. 6A is a view for explaining a playlist search method according to a third embodiment.

As shown in FIG. 6A, it is assumed that the user uses the input unit 18 to instruct playback start of the playlist PL1 (first playlist) while the playlist PL1 is displayed as shown in FIG. 6A. In this case, the CPU 12 makes the content playback unit 22 play the content A and searches for the second playlist in the hard disk 27, the external medium 34 or the external device 38. The CPU 12 uses the search criteria of the content attribute information of the content A (first content) to search for the second playlist containing the second content having one or more pieces of common content attribute information with the content A.

Figure 6B:
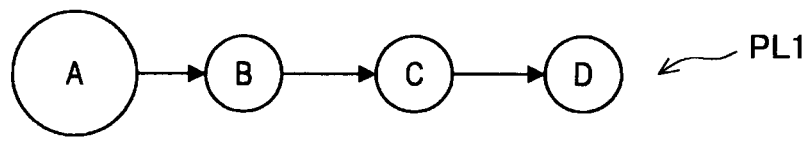
FIG. 6B is a view for explaining the playlist search method according to the third embodiment.

Here, as there is no playlist that matches the search criteria on the external device 38, the external medium 34 and the hard disk 27, the CPU 12 displays only the playlist PL1 as shown in FIG. 6B.

On the other hand, when playback of the content A is finished, the CPU 12 makes the content playback unit 22 play the content B and searches for the second playlist using the search criteria of the content attribute information of the content B (first content). Here, as there exists the playlist PL2 which meets the search criteria on the external device 38, the CPU 12 obtains the playlist PL2 based on the search result and stores it in the operation area on the RAM 16. After the CPU 12 obtains the playlist PL2, as shown in FIG. 6C, the CPU 12 makes plural contents contained in the playlists PL1 and PL2 displayed on the display unit 20 in such a manner that the playlists PL1 and PL2 cross each other at the base point of the content B and content b.

Figure 6C:
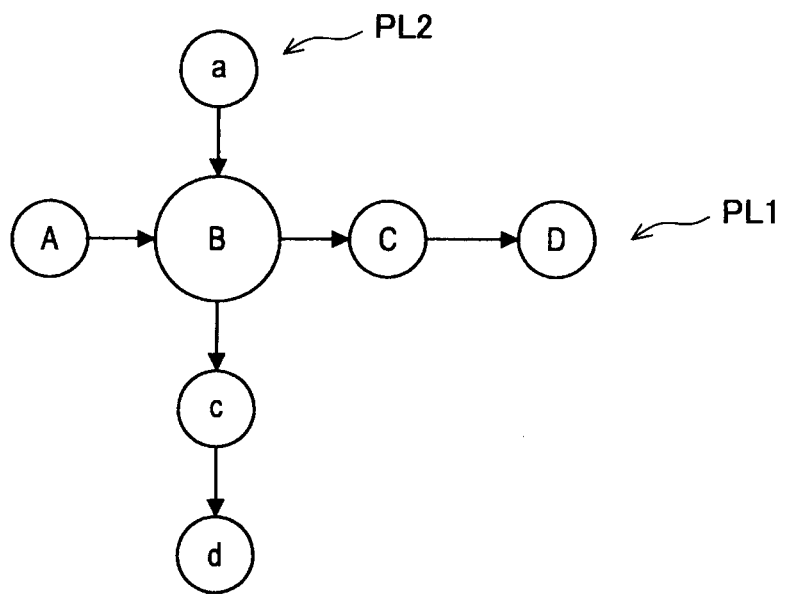
FIG. 6C is a view for explaining the playlist search method according to the third embodiment.

Here, the CPU 12 assumes that the user uses the input unit 18 to select as the first content a content c on the playlist PL2 in the state shown in FIG. 6C. In this case, the CPU 12 makes the processing selection menu displayed on the display unit 20 in the same manner as described with reference to FIG. 5G. The user is able to select execution of search of the third playlist (related playlist) pr execution of playback processing of the content c while the processing selection menu is displayed.

Figure 6D:
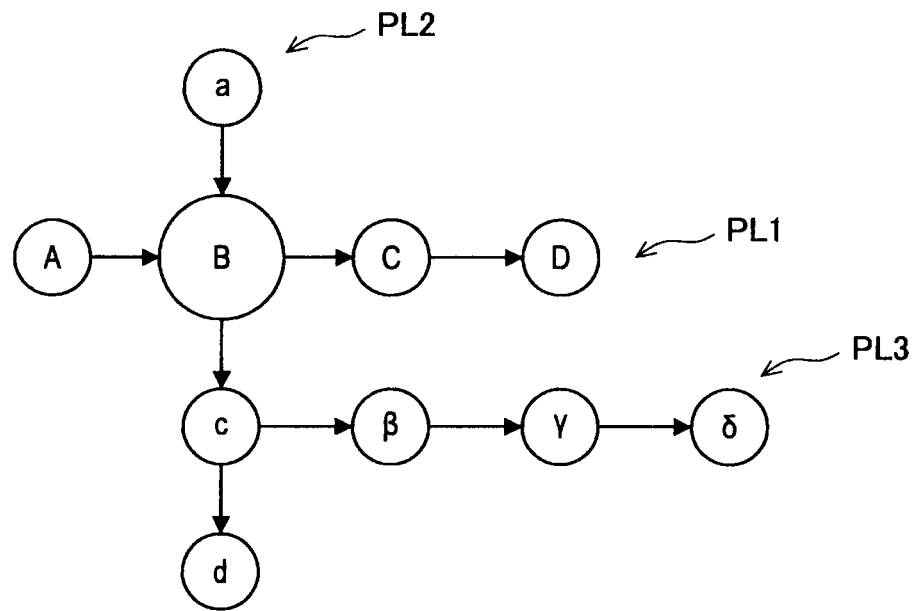
FIG. 6D is a view for explaining the playlist search method according to the third embodiment.

When the user selects execution of search processing of the third playlist, as in the second embodiment, the CPU 12 searches for the third playlist and makes it displayed on the display unit 20 together with the second playlist as shown in FIG. 6D. Meanwhile, also when the user selects execution of the playback processing of the content c, the CPU 12 makes the content playback unit 22 play the content c instead of the content B as in the second embodiment.

Figure 6E:
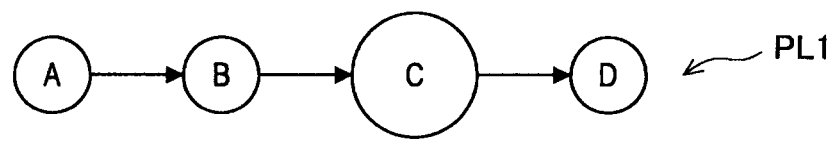
FIG. 6E is a view for explaining the playlist search method according to the third embodiment.

Meanwhile, when the playback of the content B is finished, the CPU 12 makes the content playback unit 22 play the content C and searches for the second playlist using the search criteria of the content attribute information of the content C (first content). Here, as there is no playlist that meets the search criteria on the external device 38, the external medium 34 or the hard disk 27, the CPU 12 displays only the playlist PL1 as shown in FIG. 6E.

In the above-described third embodiment, in accordance with sequential playback of contents following the first playlist, the content attribute information of the played first content is used as search criteria to search for and display the second playlist. Then, in accordance with the content selection operation on the first or second playlist, the selected content is played. Then, the user can easily know the group of the first and second playlists associated with each other by the played first content, and select his favorite playlist and/or content effectively.

(Modified Example of Playlist Display)

In the above-described first to third embodiments, when plural playlists hit as the second (or third) playlist are displayed, sometimes the display is complicated so that the viewability of the playlist display may be lowered. In this case, the playlist display may be modified, which is described with reference to FIGS. 7A to 7E and FIGS. 8A to 8E.

<Modified Example 1>

Figure 7C:
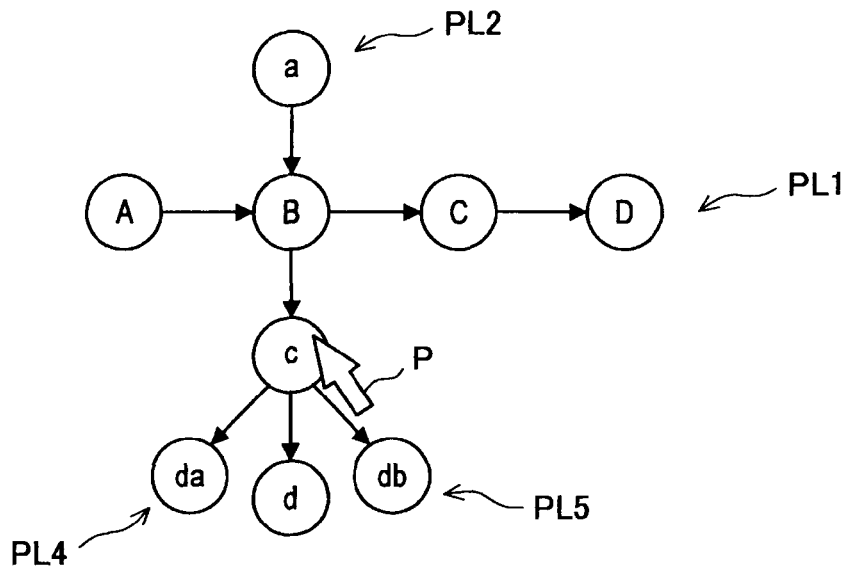
FIG. 7C is a view for explaining the modified example 1 of playlist display.

First, a modified example 1 of the playlist display will be described with reference to FIGS. 7A to 7B. FIGS. 7A to 7E are views for explaining the modified example 1 of the playlist display.

FIG. 7A shows the playlists PL1, PL2, PL4 and PL5 stored/held in at least one of the hard disk 27, the external medium 34 and the external device 38. Here, the details of the playlists PL1 and PL2 have been already described with reference to FIG. 3A and explanation thereof is omitted here.

The playlist PL4 is used for playing contents a, b c and da sequentially in this order and the playlist PL5 is used for playing contents a, b, c and db sequentially in this order. The content b contained in the playlists PL2, PL4 and PL5 has one or more pieces of common content attribute information with the content B contained in the playlist PL1. In addition, the playlists PL2, PL4 and PL5 contain common contents a, b and c.

It is assumed that as shown in FIG. 7B, when the playlist PL1 is displayed, the content B is selected as the first content to search for the second playlist. In this case, the CPU 12 searches for and obtains the playlists PL2, PL4 and PL5 as the second playlist and stores them in the operation area on the RAM 16.

As shown in FIG. 7C, the CPU 12 makes the playlists PL1, PL2, PL4 and PL5 displayed in such a manner that the playlist PL1 crosses the playlists PL2, PL4 and PL5 at the base points of content B and content b. Further, instead of making the playlist PL1 and the three playlists (playlists PL2, PL4 and PL5) displayed as crossing each other, the contents a, b and c common to the playlists PL2, PL4 an PL5 are displayed as integrated into one playlist and crossing the playlist PL1. Further, the contents d, da and db which are not common to the playlists PL2, PL4 and PL5 are displayed as three separate contents derived from the content c.

Figure 7D:
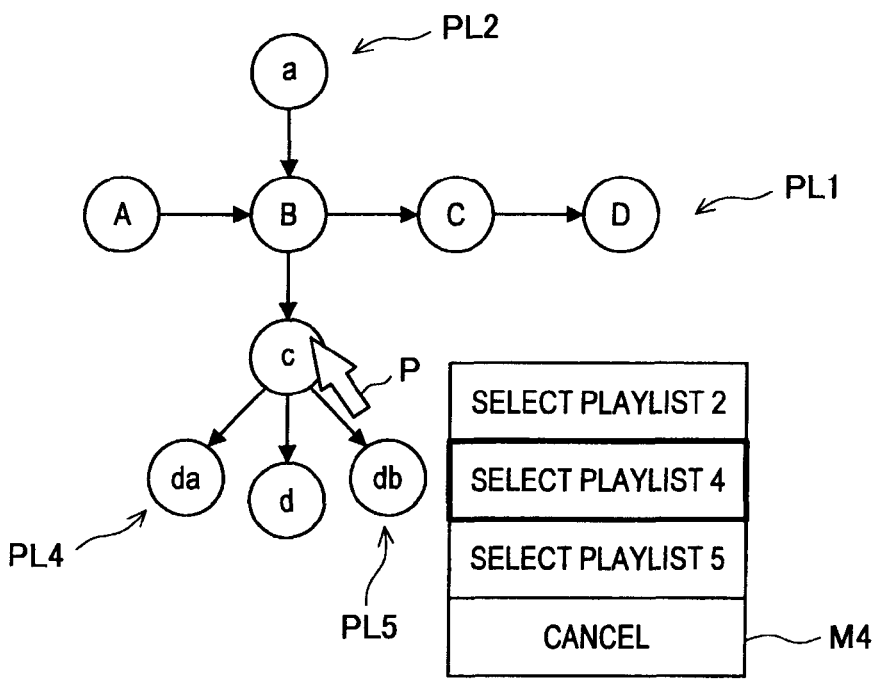
FIG. 7D is a view for explaining the modified example 1 of playlist display.
Figure 7E:
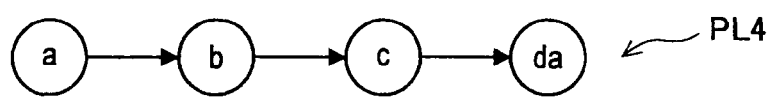
FIG. 7E is a view for explaining the modified example 1 of playlist display.

It is assumed that as shown in FIG. 7C, when the playlists PL1, PL2, PL4 and PL5 are displayed, the user uses the input unit 18 to select a common content (for example, content c) contained in the playlists PL2, PL4 and PL5. In this case, the CPU 12 makes the processing selection menu M4 displayed on the display unit 20 as shown in FIG. 7D. When the processing selection menu M4 is displayed, the user is able to select the playlist PL2, PL4 or PL5 as the second playlist.

When the user selects the playlist PL2, PL4 or PL5 (for example, the playlist PL4) on the processing selection menu M4, the CPU 12 changes the first playlist from the playlist PL1 to the playlist PL4. Then, the CPU 12 makes the content attribute information of contents a, b, c and da contained in the playlist PL4 displayed on the display unit 20 in the playback order.

Here, if the user selects the content d, da or db contained in the playlists PL2, PL4 and PL5, respectively, instead of selecting a common content contained in the playlists PL2, PL4 and PL5, the CPU 12 may change the first playlist from the playlist PL1 to the playlist PL2, PL4 or PL5.

<Modification 2>

Figure 8A:
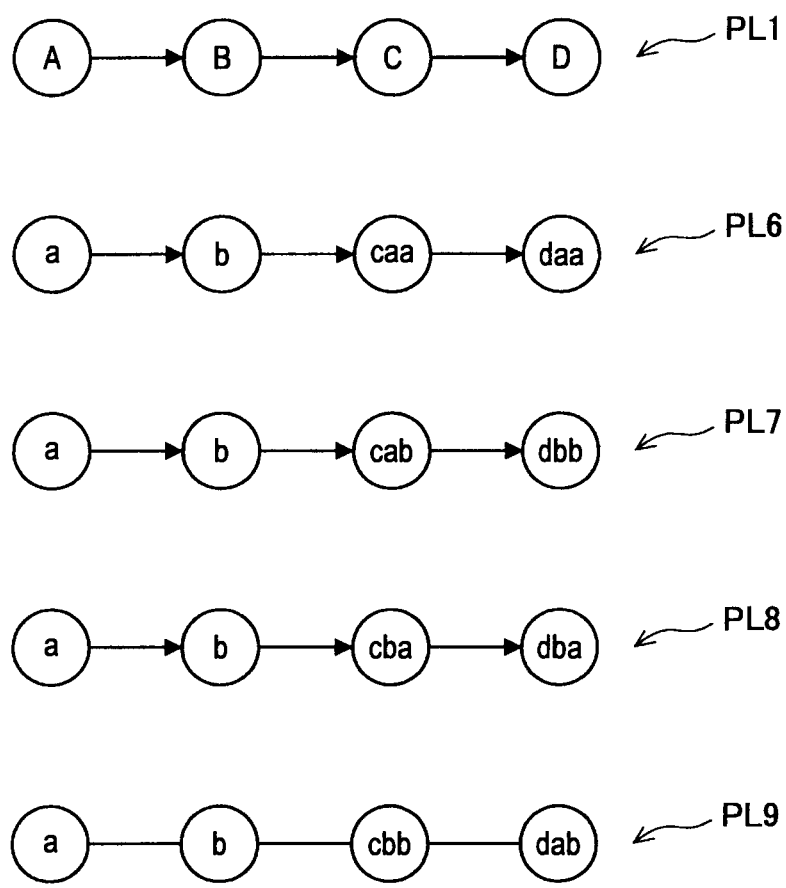
FIG. 8A is a view for explaining a modified example 2 of playlist display.
Figure 8B:
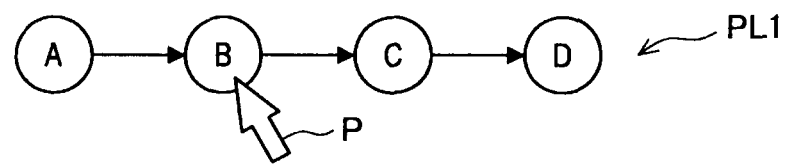
FIG. 8B is a view for explaining the modified example 2 of playlist display.

Next, a modified example 2 of the playlist display will be described with reference to FIGS. 8A to 8E. FIGS. 8A to 8B are views for explaining the modified example 2 of the playlist display.

FIG. 8A shows the playlists PL1 and PL6 to PL9 stored/held in at least one of the hard disk 27, the external medium 34 and the external device 38. Here, the details of the playlist PL1 has been already described with reference to FIG. 3A and explanation thereof is omitted here.

The playlist PL6 is used for playing contents a, b, caa, daa sequentially in this order and the playlist PL7 is used for playing contents a, b, cab, dbb sequentially in this order. The playlist PL8 is used for playing contents a, b, cba, dba sequentially in this order and the playlist PL9 is used for playing contents a, b, cbb, dab sequentially in this order.

The content b contained in the playlists PL6 to PL9 has one or more pieces of common content attribute information with the content B contained in the playlist PL1. Further, the playlists PL6 to PL9 contain common contents a and b. Furthermore, the contents caa, cab and the contents cba, cbb are classified into comparable content groups Gca and Gcb, respectively. Here, the content groups Gca, Gcb may be, for example, music genres Gca, Gcb, record albums Gca, Gcb, or artist names Gca, Gcb.

It is assumed that, as shown in FIG. 8B, when the playlist PL1 is displayed, the content B is selected as the first content to search for the second playlist. In this case, the CPU 12 searches for and obtains the playlists PL6 to PL9 as the second playlist and stores them in the operation area on the RAM 16.

Figure 8C:
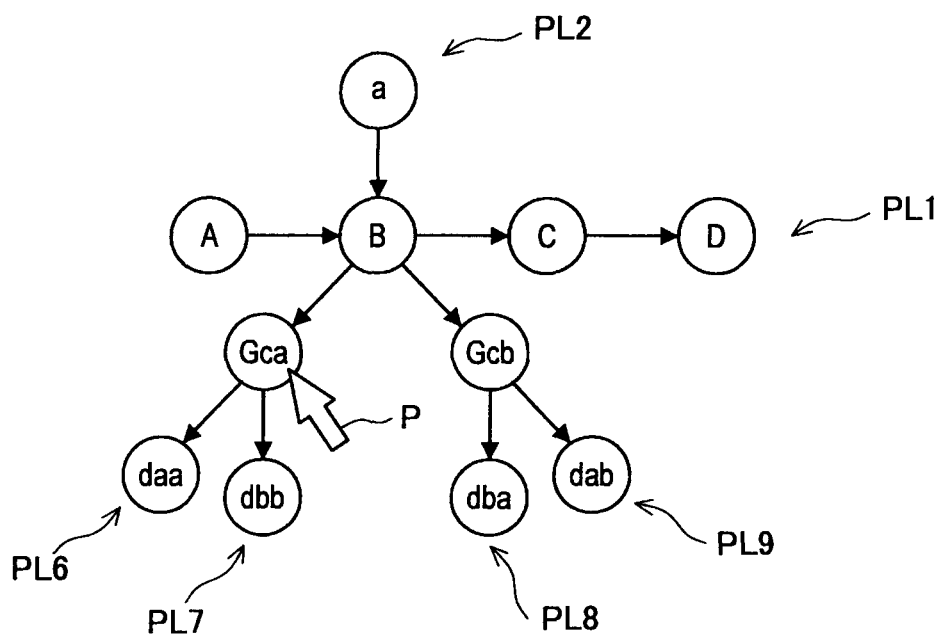
FIG. 8C is a view for explaining the modified example 2 of playlist display.

The CPU 12 displays the playlists PL1 and PL6 to PL9 in such a manner that the playlist PL1 crosses the playlists PL6 to PL9 at the base points of the content B and content b, as shown in FIG. 8C. Instead of displaying the playlist PL1 and the four playlists (playlists PL6 to PL9) as crossing each other, contents a and b common to the playlists PL6 to PL9 are displayed as integrated into one playlist and crossing the playlist PL1.

Further, the contents caa, cab classified into the content group Gca and the contents cba, cbb classified into the content group Gcb are displayed as integrated into the content groups Gca and Gcb, respectively. Furthermore, the contents daa and dbb which are not common to the playlists PL6 and PL7 are displayed as two separate contents derived from the content group Gca. Likewise, the contents dba and dab which are not common to the playlists PL8 and PL9 are displayed as two separate contents derived from the content group Gcb.

Figure 8D:
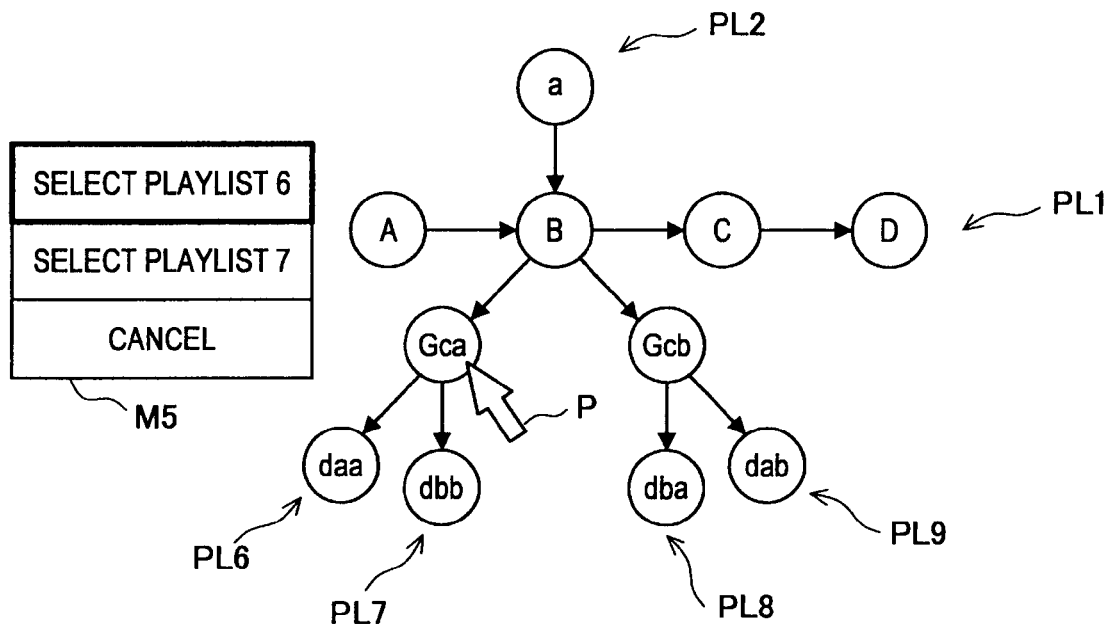
FIG. 8D is a view for explaining the modified example 2 of playlist display.

It is assumed that, as shown in FIG. 8C, when the playlists PL1 and PL6 to PL9 are displayed, the user uses the input unit 18 to select a common content (for example, the content group Gca) contained in the playlists PL6 to PL9. In this case, the CPU 12 displays the processing selection menu M5 on the display unit 20 as shown in FIG. 8D. When the processing selection menu M5 is displayed, the user is able to select the playlist PL6 or PL7 as the second playlist.

Figure 8E:
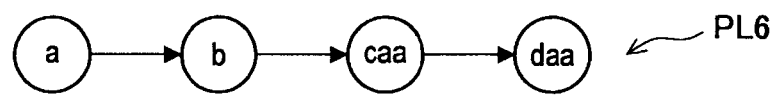
FIG. 8E is a view for explaining the modified example 2 of playlist display.

When the user selects the playlist PL6 pr PL7 (for example, the playlist PL6) on the processing selection menu M5, the CPU 12 changes the first playlist from the playlist L1 to the playlist PL6. Then, as shown in FIG. 8E, the CPU 12 makes the content attribute information of the contents a, b, caa and daa contained in the playlist PL6 displayed on the display unit 20 in the playback order.

Here, the CPU 12 may change the first playlist from the playlist PL1 to the playlist PL6, PL7, PL8 or PL9 by selecting either of the contents daa, dbb, dba and dab contained in the playlists PL6 to PL9, respectively, instead of selecting the common content contained in the playlists PL6 to PL9.

In the above-described modified examples 1, 2 of playlist display, common contents contained in multiple playlists or contents classified into a common content group are displayed integrally. Hence, when the multiple playlists are displayed in the first to third embodiments, it becomes possible to prevent complicated display and also prevent deterioration of the viewability of the playlist display.

As described above, according to the playlist search method of the embodiments of the present invention, the content attribute information of the first content is used as search criteria to search for the second playlist containing the second content having one or more pieces of the same content attribute information. Then, the first and second playlists are displayed in such a manner that they cross each other with the first and second contents used as the base point. With this structure, it is possible to search for the second playlist as a related playlist without losing continuity, association and the like between contents.

It should be understood by those skilled in the art that various modifications, combinations, sub-combinations and alterations may occur depending on design requirements and other factors insofar as they are within the scope of the appended claims or the equivalents thereof.

For example, in the above description, the playlist search device 10 searches for a playlist of sound contents and the sound contents contained in the playlist are played. However, the present invention is also applicable to the case in which the playlist search device searches for a playlist of contents of static images, moving images or the like and these contents contained in the playlist are played.

In this case, the continuity and association between contents mean that the contents show similarity in image characteristics, recording date and time, recording place or the like. As a specific application example of the playlist search method, for example, there is a case of searching for a playlist containing contents showing similarity in recording date and time and/or recording place.

The present application contains subject matter related to that disclosed in Japanese Priority Patent Application JP 2008-271151 filed in the Japan Patent Office on 21 Oct. 2008, the entire content of which is hereby incorporated by reference.

What is claimed is:

1. A playlist search device comprising:
a playlist search unit configured to use, as a search criteria, one or more pieces of content attribute information of a first content contained in a first playlist to search for a second playlist which contains a second content having one or more pieces of common content attribute information with the first content and is different from the first playlist, wherein the first playlist has a first playback order and the second playlist has a second playback order;
a playlist obtaining unit configured to obtain the first playlist and the second playlist; and
a playlist display unit configured to display a plurality of contents contained in the first playlist and the second playlist in such a manner that the first playlist and the second playlist intersect each other with the first content and the second content as a single base point.

2. The playlist search device according to claim 1, further comprising:
a content selecting unit configured to select one of the contents in the second playlist to be played; and
a playlist change unit configured to replace the first playlist with the second playlist as a now-playing playlist.

3. The playlist search device according to claim 2, further comprising:
a content playback unit configured to play contents contained in the playlists,
wherein the content playback unit plays contents contained in the first playlist in accordance with the first playback order and, when the playlist change unit changes the second playlist to be the now-playing playlist, plays contents contained in the second playlist in a second predetermined playback order.

4. The playlist search device according to claim 3, wherein when content selecting unit selects a content preceding or subsequent to the second content, the second predetermined playback order begins with the second content or a content preceding or subsequent to the second content.

5. The playlist search device according to claim 3, wherein when content selecting unit selects a content which precedes the second content in the second playlist, the second predetermined playback order is a reverse order to the second playback order.

6. The playlist search device according to claim 1, further comprising:
a content playback unit configured to play contents,
wherein the playlist search unit uses the one or more pieces of content attribute information of the first content to search for the second playlist when the first content of the first playlist is being played.

7. The playlist search device according to claim 6, wherein the playlist search unit uses, as search criteria, one or more pieces of content attribute information of a third content other than the second content contained in the second playlist to further search for a third playlist which contains a fourth content having one or more pieces of common content attribute information with the third content, the third playlist being different from the second playlist,
the playlist obtaining unit further obtains the third playlist, and
the playlist display unit displays the contents contained in the second playlist and the third playlist in such a manner that the second playlist and the third playlist intersect each other with the third content and the fourth content as a second single base point.

8. The playlist search device according to claim 1, wherein, when the search by the playlist search unit results in more than one second playlist having common contents, the playlist display unit integrates the common contents and displays the more than one second playlist with the integrated common contents.

9. The playlist search device according to claim 1, wherein, when the search by the playlist search unit results in more than one second playlist having two or more contents classified into one or more content groups, the playlist display unit integrates the two or more contents classified into the content groups and displays the more than one second playlist with the integrated content groups.

10. The playlist search device according to claim 1, wherein
the playlist search unit searches for the second playlist in an external device connected to the playlist search device, and
the playlist obtaining unit obtains the second playlist from the external device.

11. A playlist search method comprising the steps of:
using, as a search criteria, one or more pieces of content attribute information of a first content contained in a first playlist to search for a second playlist which contains a second content having one or more pieces of common content attribute information with the first content and is different from the first playlist;
obtaining the first playlist and the second playlist; and
displaying a plurality of contents contained in the first playlist and the second playlist in such a manner that the first playlist and the second playlist intersect each other with the first content and the second content as a single base point.

12. A non-transitory computer-readable medium storing a computer program, the computer program, when executed by a computer, causing the computer to execute a playlist search method comprising the steps of:
using, as a search criteria, one or more pieces of content attribute information of a first content contained in a first playlist to search for a second playlist which contains a second content having one or more pieces of common content attribute information with the first content and is different from the first playlist;
obtaining the first playlist and the second playlist; and
displaying a plurality of contents contained in the first playlist and the second playlist in such a manner that the first playlist and the second playlist intersect each other with the first content and the second content as a single base point.

* * * * *